US011862379B2

(12) United States Patent
Matsui et al.

(10) Patent No.: US 11,862,379 B2
(45) Date of Patent: Jan. 2, 2024

(54) COIL COMPONENT AND ELECTRONIC DEVICE

(71) Applicant: TAIYO YUDEN CO., LTD., Tokyo (JP)

(72) Inventors: Motoki Matsui, Takasaki (JP); Hidenori Aoki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/725,431

(22) Filed: Apr. 20, 2022

(65) Prior Publication Data

US 2022/0246344 A1 Aug. 4, 2022

Related U.S. Application Data

(63) Continuation of application No. 16/269,398, filed on Feb. 6, 2019, now Pat. No. 11,342,109.

(30) Foreign Application Priority Data

Feb. 9, 2018 (JP) ................................ 2018-022275

(51) Int. Cl.
*H01F 17/04* (2006.01)
*H01F 27/28* (2006.01)
*H01F 27/29* (2006.01)

(52) U.S. Cl.
CPC ....... *H01F 27/2804* (2013.01); *H01F 17/045* (2013.01); *H01F 27/2823* (2013.01); *H01F 27/29* (2013.01); *H01F 27/292* (2013.01)

(58) Field of Classification Search
CPC ............... H01F 27/2804; H01F 17/045; H01F 27/2823; H01F 27/29; H01F 27/292; H01F 27/24; H01F 27/2852
See application file for complete search history.

(56) References Cited

U.S. PATENT DOCUMENTS 5,530,416 A * 6/1996 Wakamatsu ........ H01F 41/0246 336/233
5,719,547 A 2/1998 Kaneko et al.
(Continued)

FOREIGN PATENT DOCUMENTS

| | | | |
|---|---|---|---|
| JP | 2014099501 | A | 5/2014 |
| JP | 2016201466 | A | 12/2016 |
| TW | 200644000 | A | 12/2006 |

OTHER PUBLICATIONS

A Notification of Examination Opinions with Search Report issued by Taiwan Intellectual Property Office, dated Jun. 5, 2019, for Taiwan counterpart application No. 108101799, (3 pages).
(Continued)

*Primary Examiner* — Mang Tin Bik Lian
(74) *Attorney, Agent, or Firm* — Law Office of Katsuhiro Arai

(57) ABSTRACT

In an exemplary embodiment, a coil component includes: a drum core 10 that includes a winding shaft 12 and flange parts 14*a*, 14*b*; a coil 40 that includes a winding part 42 and a pair of lead parts 44*a*, 44*b* led out from the winding part 42 toward a side face 22 of the flange part 14*a* and then bent onto the flange part 14*a* along the side face 22; and a pair of external electrodes 60*a*, 60*b* provided on the outer face 17*a* of the flange part 14*a*, and connected to the pair of lead parts 44*a*, 44*b*; wherein the shortest distance L4 between the side face 22 and the outermost periphery of the winding part 42 is shorter than the shortest distance L3 between a side face 24, opposite the side face 22, of the flange part 14*a*, and the outermost periphery of the winding part 42.

12 Claims, 6 Drawing Sheets

(56) References Cited

U.S. PATENT DOCUMENTS

| | | | | |
|---|---|---|---|---|
| 6,154,112 | A | 11/2000 | Aoba et al. | |
| 7,463,130 | B2 * | 12/2008 | Oki | H01F 27/027 336/192 |
| 9,966,187 | B2 * | 5/2018 | Aoki | H01F 27/292 |
| 10,636,558 | B2 * | 4/2020 | Uchida | H01F 17/045 |
| 2004/0155745 | A1 | 8/2004 | Wang | |
| 2006/0071749 | A1 * | 4/2006 | Aoki | H01F 17/045 336/83 |
| 2007/0063804 | A1 | 3/2007 | Watanabe | |
| 2012/0086534 | A1 * | 4/2012 | Wu | H01F 17/045 336/83 |
| 2013/0027166 | A1 | 1/2013 | Wada et al. | |
| 2014/0002227 | A1 * | 1/2014 | Hsieh | H01F 5/003 336/200 |
| 2014/0154920 | A1 | 6/2014 | Dinh et al. | |
| 2015/0310975 | A1 * | 10/2015 | Wu | H01F 3/08 336/83 |
| 2016/0217919 | A1 * | 7/2016 | Iwata | H01F 27/29 |
| 2017/0011843 | A1 * | 1/2017 | Mikogami | H01F 27/292 |
| 2017/0034915 | A1 | 2/2017 | Uchikoba et al. | |
| 2017/0053739 | A1 | 2/2017 | Oki et al. | |
| 2017/0229232 | A1 * | 8/2017 | Takagi | H01F 27/306 |
| 2017/0287605 | A1 | 10/2017 | Tanada | |
| 2017/0330672 | A1 * | 11/2017 | Uchida | H01F 27/255 |
| 2021/0050135 | A1 * | 2/2021 | Kobayashi | H01F 27/2828 |

OTHER PUBLICATIONS

Final Office Action issued by U.S. Patent and Trademark Office, dated Dec. 13, 2021, for U.S. Appl. No. 16/269,398 (13 pages).

Non-Final Office Action issued by U.S. Patent and Trademark Office, dated Aug. 9, 2021, for U.S. Appl. No. 16/269,398 (21 pages).

Notice of Allowance issued by US. Patent and Trademark Office, dated Apr. 13, 2022, for U.S. Appl. No. 16/269,398 (11 pages).

* cited by examiner

COIL COMPONENT AND ELECTRONIC DEVICE

CROSS-REFERENCE TO RELATED APPLICATIONS

This application is a continuation of U.S. patent application Ser. No. 16/269,398, filed Feb. 6, 2019, which claims priority to Japanese Patent Application No. 2018-022275, filed Feb. 9, 2018, each disclosure of which is incorporated herein by reference in its entirety. The applicant herein explicitly rescinds and retracts any prior disclaimers or disavowals or any amendment/statement otherwise limiting claim scope made in any parent, child or related prosecution history with regard to any subject matter supported by the present application.

BACKGROUND

Field of the Invention

The present invention relates to a coil component and an electronic device.

Description of the Related Art

Coil components that are structured in such a way that both ends of a conductive wire constituting a coil are led out to the opposing end faces of an element body part of rectangular solid shape and connected to external electrodes, and that the external electrodes are covered with an insulating resin except the parts provided on the bottom face of the element body part, are known (refer to Patent Literature 1, for example). Also, coil components are known that comprise: a drum core including a winding shaft and a pair of flange parts provided at both ends of the winding shaft; and a coil including a winding part constituted by a conductive wire being wound around the winding shaft, and lead parts which are parts of the conductive wire being led out from the winding part. Among these coil components, constitutions where the lead parts are bent toward one of the pair of flange parts and connected to external electrodes, are known (refer to Patent Literature 2, for example).

BACKGROUND ART LITERATURES

[Patent Literature 1] Japanese Patent Laid-open No. 2016-201466

[Patent Literature 2] Japanese Patent Laid-open No. 2014-99501

SUMMARY

Recent years have seen a demand for coil components that not only require a small installation space but also allow large current to flow through them. However, the structure in Patent Literature 1, where the lead parts of the conductive wire are connected to external electrodes that are provided on two separate faces, is unable to meet the small installation space requirement. The structure in Patent Literature 2, where the lead parts of the conductive wire are connected to external electrodes that are provided on a single face, is able to meet the small installation space requirement; to allow large current to flow through it, however, this structure may use a conductive wire of large cross-section area, such as one having a wire diameter of 0.2 mm or greater, in which case the circuit tends to open where the conductive wire is joined to the external electrodes, because of the elastic force of the conductive wire, etc. To solve these problems, a structure is devised pertaining to a coil component comprising a coil wound around a winding shaft of a drum core, where lead parts of the conductive wire constituting the coil are led out from a winding part of the coil and then bent toward one of a pair of flange parts of the drum core, wherein the conductive wire is not joined to external electrodes, but external electrodes are instead formed by means of sputtering, plating, etc., at the ends of the conductive wire. In this case, however, the elasticity of the conductive wire may cause the winding of the coil in the winding part to loosen when bending is performed toward one of the pair of flange parts. Especially in recent years, the trend is to use rectangular wires and other conductive wires of large cross-sections, and also to use alpha-winding and other structures where the conductive wire is wound by applying hardly any force in the bending direction, which makes the end of winding in the winding part of the coil particularly vulnerable to loosening. This loosening of the winding leads to a drop in inductance, etc.

The present invention was developed in light of the aforementioned problems, and its object is to prevent the end of winding in the winding part of the coil from becoming loose and thereby prevent the inductance from dropping.

Any discussion of problems and solutions involved in the related art has been included in this disclosure solely for the purposes of providing a context for the present invention, and should not be taken as an admission that any or all of the discussion were known at the time the invention was made.

The present invention is a coil component, comprising: a drum core that includes a winding shaft, and a first flange part and a second flange part (the second flange part is optional) provided, respectively, at both ends of the winding shaft in the axial direction; a coil that includes a winding part constituted by a conductive wire being wound around the winding shaft, and a pair of lead parts constituted by the conductive wire being led out from the winding part toward a first side face of the first flange part and then bent toward the first flange part along the first side face of the first flange part; and a pair of external electrodes that are provided on the outer face, which is the face opposite the inner face on which the winding shaft is provided, of the first flange part, and connected to the pair of lead parts; wherein the shortest distance between the first side face of the first flange part and the outermost periphery (the outermost wound part) of the winding part is shorter than the shortest distance between a second side face, which is the face opposite the first side face across the winding shaft, of the first flange part, and the outermost periphery of the winding part.

The aforementioned constitution may be such that the shortest distance between the first side face of the first flange part and the outermost periphery of the winding part is equal to or smaller than the thickness of the conductive wire in the direction vertical to the axial center of the winding shaft.

The aforementioned constitution may be such that the shortest distance between a third side face of the second flange part and the outermost periphery of the winding part is shorter than the shortest distance between a fourth side face, which is the face opposite the third side face across the winding shaft, of the second flange part, and the outermost periphery of the winding part, and that the first side face of the first flange part, and the third side face of the second flange part, are positioned on the same side of the winding shaft.

The aforementioned constitution may be such that the axial center of the winding shaft is offset from the center of the inner face of the first flange part toward the first side face of the first flange part.

The aforementioned constitution may be such that an exterior resin formed by a resin containing magnetic grains is provided, in a manner covering the coil, at least partially between the first flange part and the second flange part, and that the exterior resin covers the pair of lead parts, but on the first side face of the first flange part, the exterior resin projects outward beyond the first side face of the first flange part.

The aforementioned constitution may be such that the minimum value of the thickness of the exterior resin covering the lead parts in the direction vertical to the axial center of the winding shaft, on the first side face side of the first flange part, is greater than the minimum value of the thickness of the exterior resin covering the winding part in the direction vertical to the axial center of the winding shaft, on the side of a side face, other than the first side face, of the first flange part.

The aforementioned constitution may be such that the exterior resin projects outward beyond the first side face of the first flange part on the first side face of the first flange part, while staying between the first flange part and the second flange part on at least one side face, excluding the first side face, of the first flange part.

The aforementioned constitution may be such that the minimum value of the thickness of the exterior resin covering the lead parts in the direction vertical to the axial center of the winding shaft, on the first side face side of the first flange part, is 0.2 mm or greater.

The aforementioned constitution may be such that the winding part stays between the first flange part and the second flange part.

The aforementioned constitution may be such that, with respect to the coil, the conductive wire is alpha-wound around the winding shaft.

The aforementioned constitution may be such that, with respect to the coil, the conductive wire is a rectangular wire.

The aforementioned constitution may be such that the pair of external electrodes are provided only on, among the surfaces of the coil component, those surfaces that include the outer face of the first flange part.

The present invention is directed to an electronic device comprising: any of the aforementioned coil components; and a circuit board on which the coil component is mounted.

According to the present invention, loosening of the end of winding in the winding part of the coil can be prevented, and consequently dropping of the inductance can be prevented.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1A:
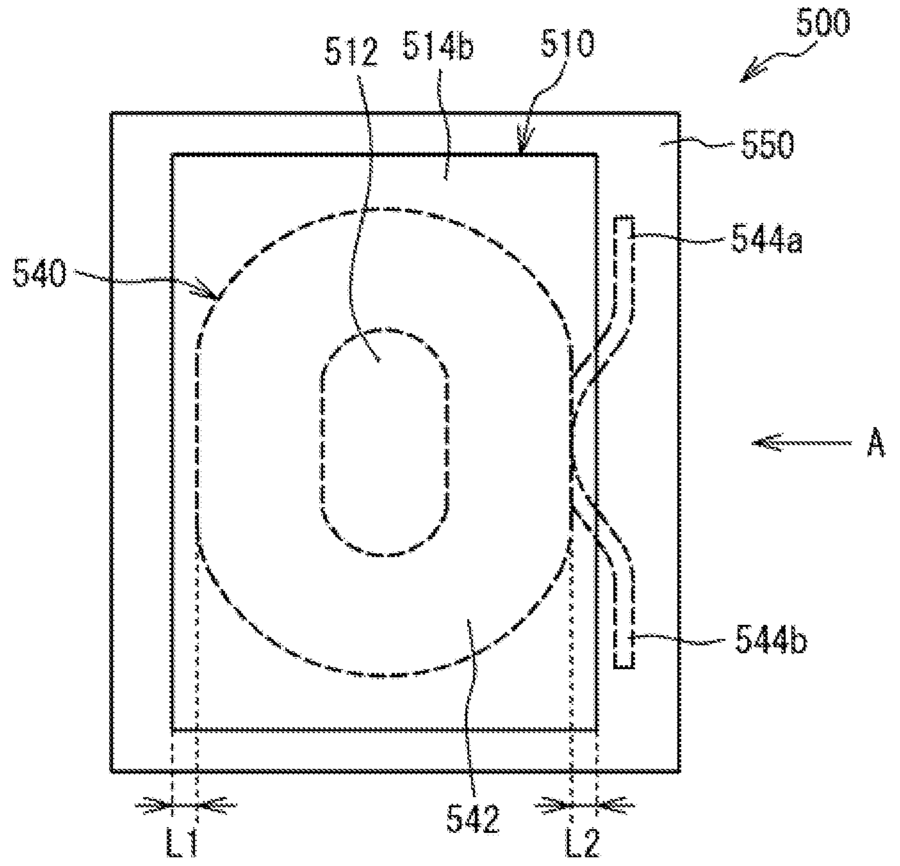
FIG. 1A is a perspective plane view of the coil component pertaining to a comparative example.

10 Drum core
12 Winding shaft
14*a*, 14*b* Flange part
15*a*, 15*b* Inner face
17*a* Outer face
16 Center
18 Center
20 Axial center
22 to 28 Side face
32 to 38 Side face
40 Coil
42 Winding part
44*a*, 44*b* Lead part
46 Conductive wire
50 Exterior resin
60*a*, 60*b* External electrode
80 Circuit board
82 Electrode
84 Solder
100, 200 Coil component
300 Electronic device

DETAILED DESCRIPTION OF EMBODIMENTS

Examples of the present invention are explained below by referring to the drawings.

Example 1

Figure 1B:
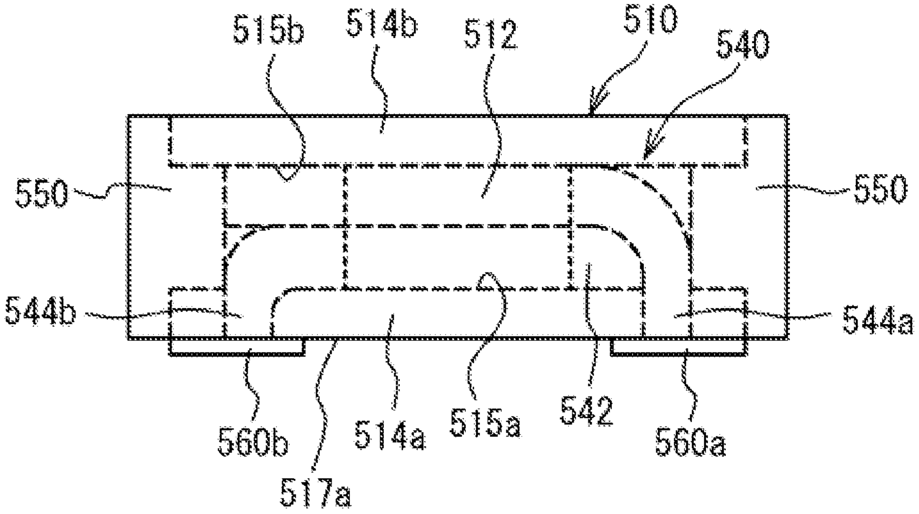
FIG. 1B is a perspective side view of FIG. 1A from direction A.

First, the coil component in a comparative example is explained. FIG. 1A is a perspective plane view of the coil component pertaining to the comparative example, and FIG. 1B is a perspective side view of FIG. 1A from direction A. As shown in FIGS. 1A and 1B, the coil component 500 in the comparative example comprises a drum core 510 and a coil 540. The drum core 510 includes a winding shaft 512, and flange parts 514*a*, 514*b* provided at both ends of the winding shaft 512. The axial center of the winding shaft 512 corresponds to the centers of the inner faces 515*a*, 515*b*, on which the winding shaft 512 is provided, of the flange parts 514*a*, 514*b*. Here, the "inner faces 515*a*, 515*b*" include the parts where the winding shaft 512 is provided. The centers of the inner faces 515*a*, 515*b* of the flange parts 514*a*, 514*b* represent the centroids of the inner faces 515*a*, 515*b* of the flange parts 514*a*, 514*b*, for example. In one example, the inner faces 515*a*, 515*b* of the flange parts 514*a*, 514*b* are quadrilaterals, in which case their centroids are each a point of intersection between the two diagonal lines.

The coil 540 includes a winding part 542 constituted by a conductive wire being wound around the winding shaft 512, and lead parts 544*a*, 544*b* that are parts of the conductive wire being led out from the winding part 542. The lead parts 544*a*, 544*b* are bent toward the flange part 514*a*, and connected to external electrodes 560*a*, 560*b* that are provided on an outer face 517*a*, which is the face opposite the inner face 515*a*, of the flange part 514*a*. Since the axial center of the winding shaft 512 corresponds to the center of the inner face 515*a* of the flange part 514*a*, the shortest distance L2 between the outermost periphery of the winding part 542 and the side face of the flange part 514*a* toward which the lead parts 544*a*, 544*b* that have been led out in one direction are bent, is equal to the shortest distance L1 between the outermost periphery of the winding part 542 and the side face of the flange part 514*a* opposite the direction in which the lead parts 544*a*, 544*b* are led out. The coil 540 is covered by an exterior resin 550 provided around the drum core 510.

The coil component 500 in the comparative example is such that the lead parts 544*a*, 544*b* are led out from the winding part 542 to project outward beyond the flange parts 514*a*, 514*b*, after which the lead parts 544*a*, 544*b* are bent toward the flange part 514*a*. When the lead parts 544*a*, 544*b* are led out from the winding part 542 to project outward beyond the flange parts 514*a*, 514*b*, the elasticity of the conductive wire may cause the winding in the winding part 542 to loosen. Especially in recent years, the trend is to use rectangular wires and other conductive wires of greater thickness, and also to use alpha-winding and other structures where the conductive wire is wound by applying hardly any force in the bending direction, which affects the wound condition in the winding part 542 and makes this part particularly vulnerable to loosening. This can lead to deterioration in the inductance and other electric properties.

Figure 2A:
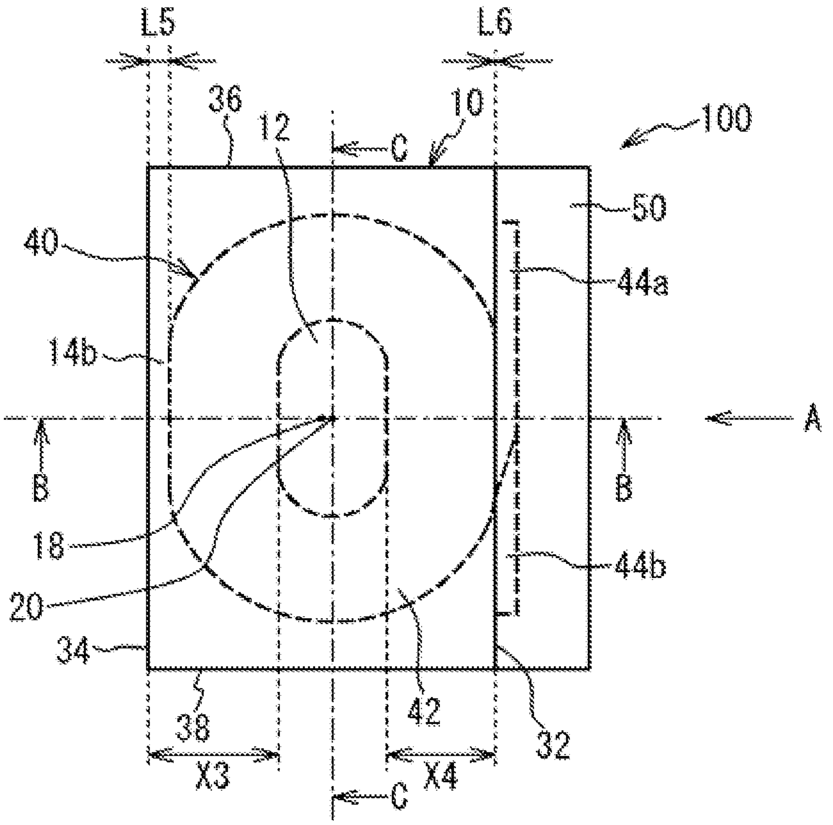
FIGS. 2A and 2B are perspective plane views of the coil component pertaining to Example 1.
Figure 2B:
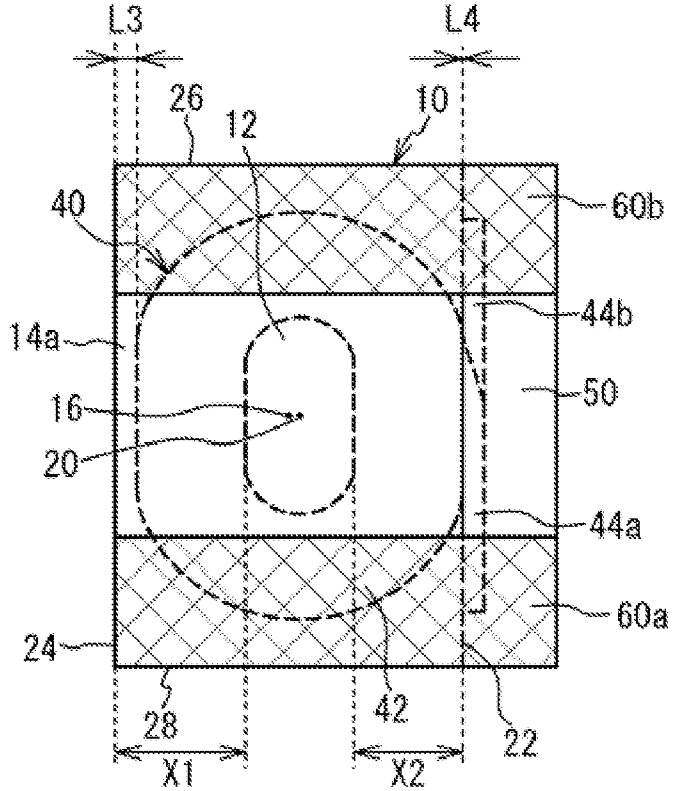
Figure 3A:
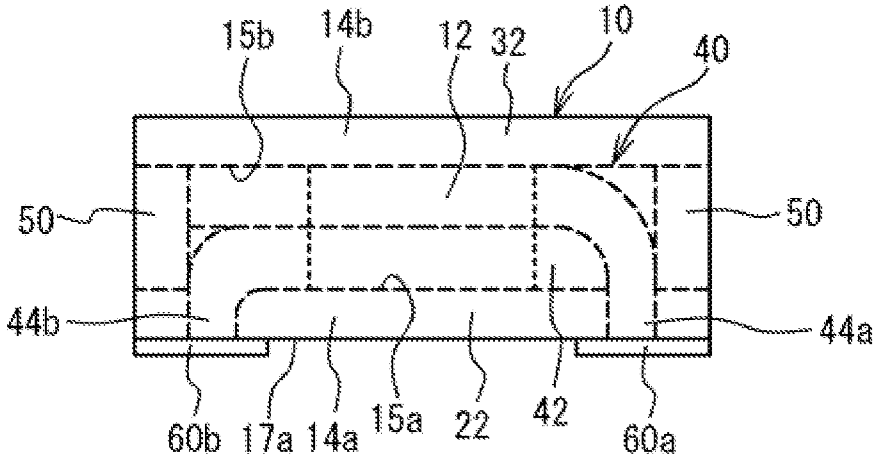
FIG. 3A is a perspective side view of FIG. 2A from direction A.
Figure 3B:
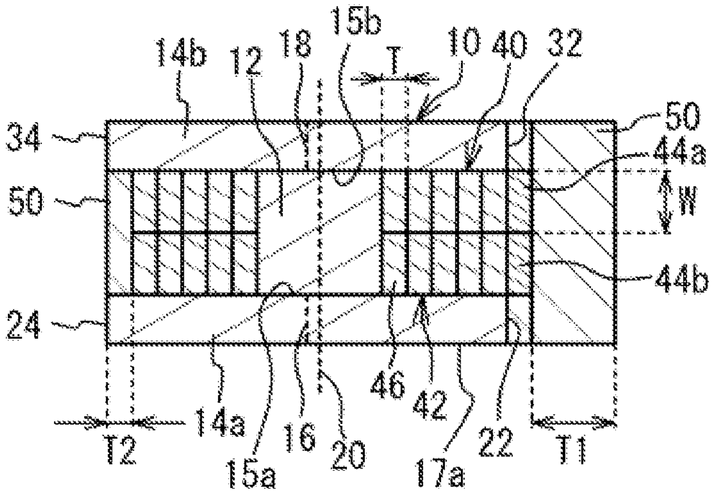
FIG. 3B is a view of cross-section B-B in FIG. 2A.
Figure 3C:
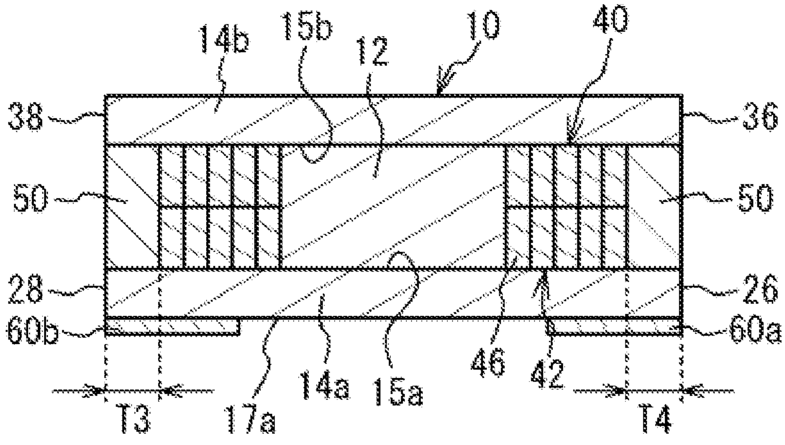
FIG. 3C is a view of cross-section C-C in FIG. 2A.

FIGS. 2A and 2B are perspective plane views of the coil component pertaining to Example 1. FIG. 2A is a perspective plane view from the side opposite the mounting face, while FIG. 2B is a perspective plane view from the mounting face side. FIG. 3A is a perspective side view of FIG. 2A from direction A, FIG. 3B is a view of cross-section B-B in FIG. 2A, and FIG. 3C is a view of cross-section C-C in FIG. 2A. As shown in FIGS. 2A, 2B, and 3A to 3C, the coil component 100 in Example 1 is an inductor element comprising a drum core 10, a coil 40, an exterior resin 50, and a pair of external electrodes 60*a*, 60*b*.

The drum core 10 includes a winding shaft 12, as well as a flange part 14*a* being a first flange part, and a flange part 14*b* being a second flange part, which together constitute a pair of flange parts provided at both ends of the winding shaft 12 in the axial direction. The winding shaft 12 has a columnar shape whose bottom face is defined by straight lines and two arcs. The flange part 14*a* being the first flange part has four side faces including a side face 22 being a first side face, a side face 24 being a second side face which is the face opposite the side face 22 across the winding shaft 12, a side face 26, and a side face 28. The flange part 14*b* being the second flange part has four side faces including a side face 32 being a third side face, a side face 34 being a fourth side face which is the face opposite the side face 32 across the winding shaft 12, a side face 36, and a side face 38. The bottom face of the winding shaft 12 has a length of approx. 1.40 mm in the long direction, and a length of approx. 0.60 mm in the short direction. The winding shaft 12 has a height of approx. 0.50 mm. It should be noted that preferably the value AB obtained by dividing the long-direction length A, by the short-direction length B, of the bottom face of the winding shaft 12, is 1.1 or greater but no greater than 2.6. The flange parts 14*a*, 14*b* are each shaped as a prism having thickness in the axial direction of the winding shaft 12. For example, the flange parts 14*a*, 14*b* are each shaped as a quadrangular prism. The bottom faces of the flange parts 14*a*, 14*b* have a length of approx. 2.0 mm in the long direction, and a length of approx. 1.20 mm in the short direction. The flange parts 14*a*, 14*b* have a thickness of approx. 0.15 mm.

The flange parts 14*a*, 14*b* are shaped as rectangles of roughly the same size in a plane view from the axial direction of the winding shaft 12, and the centers 16, 18 of these rectangles roughly correspond to each other in the axial direction of the winding shaft 12. It should be noted that “roughly the same” and “roughly correspond” include deviations within manufacturing errors or so. The winding shaft 12 is provided in the flange part 14*a* at a position offset, in the short direction of the flange part 14*a*, from the center 16 of the inner face 15*a* of the flange part 14*a* on which the winding shaft 12 is provided, and also provided in the flange part 14*b* at a position offset, in the short direction of the flange part 14*b*, from the center 18 of the inner face 15*b* of the flange part 14*b* on which the winding shaft 12 is provided. In other words, the axial center 20 of the winding shaft 12 is positioned in a manner offset from the center 16 of the inner face 15*a* of the flange part 14*a* on which the winding shaft 12 is provided, toward one side face 22 between the pair of side faces 22, 24 that are facing each other in the short direction, and also positioned in a manner offset from the center 18 of the inner face 15*b* of the flange part 14*b* on which the winding shaft 12 is provided, toward one side face 32 between the pair of side faces 32, 34 that are facing each other in the short direction. It should be noted that the inner faces 15*a*, 15*b* include the parts where the winding shaft 12 is provided. The side face 22 of the flange part 14*a*, and the side face 32 of the flange part 14*b*, are positioned on the same side of the winding shaft 12 and roughly flush with each other.

The drum core 10 is formed by a magnetic material. The drum core 10 is formed by, for example, a ferrite material, magnetic metal material, or resin containing magnetic metal grains. For example, the drum core 10 is formed by a Ni—Zn or Mn—Zn ferrite, Fe—Si—Cr, Fe—Si—Al, Fe—Si—Cr—Al, or other soft magnetic alloy, Fe, Ni, or other magnetic metal, amorphous magnetic metal, nanocrystal magnetic metal, or resin containing metal magnetic grains. If the drum core 10 is formed by a soft magnetic alloy, magnetic metal, amorphous magnetic metal, or nanocrystal magnetic metal, its grains may be insulation-treated.

The coil 40 includes a winding part 42 constituted by a conductive wire 46 being wound around the winding shaft 12 of the drum core 10, and a pair of lead parts 44*a*, 44*b* that represent both ends of the conductive wire 46 and are led out from the winding part 42. The conductive wire 46 is a rectangular wire whose cross-section has a rectangular shape, for example, but it may be something else such as a round wire whose cross-section has a circular shape. The conductive wire 46 has a width W of approx. 0.02 mm to 0.2 mm, for example, and a thickness T of approx. 0.02 mm to 0.2 mm, for example. The conductive wire 46 has its metal wire surface covered with an insulating film. Examples of materials for the metal wire include copper, silver, palladium, silver-palladium alloy, etc., while examples of materials for the insulating film include polyester imide, polyamide, etc. The coil 40 is such that the conductive wire 46, which is a rectangular wire, is alpha-wound around the winding shaft 12 of the drum core 10, for example; however, it may be wound by other winding methods.

The lead parts 44a, 44b are led out toward the side face 22 of the flange part 14a and toward the side face 32 of the flange part 14b, respectively. To shorten the distance between the outermost periphery of the winding part 42 on the side to which the lead parts 44a, 44b are led out, and the side face 22 of the flange part 14a, the axial center 20 of the winding shaft 12 is set in a manner offset from the center 16 of the inner face 15a of the flange part 14a on which the winding shaft 12 is provided. This way, the relationship of L3>L4 holds between the shortest distance L4, between the outermost periphery of the winding part 42 and the side face 22 of the flange part 14a toward which the lead parts 44a, 44b that have been led out in one direction are bent, and the shortest distance L3, between the outermost periphery of the winding part 42 and the side face 24 of the flange part 14a opposite the direction in which the lead parts 44a, 44b are led out. In other words, the shortest distance L4 between the outermost periphery of the winding part 42 and the side face 22 of the flange part 14a toward which the lead parts 44a, 44b are bent, is shorter than the shortest distance L3 between the outermost periphery of the winding part 42 and the side face 24 of the flange part 14a opposite the side face 22. In the example of FIG. 2B, the outermost periphery of the winding part 42, and the side face 22 of the flange part 14a toward which the lead parts 44a, 44b that have been led out in one direction are bent, roughly correspond to each other over a distance that prevents winding of the conductive wire 46 by one more loop; that is, over a distance equal to or smaller than the thickness of the conductive wire 46 in the direction vertical to the axial center 20 of the winding shaft 12. This means that the distance between the outermost periphery of the winding part 42 and the side face 22 of the flange part 14a is designed the smallest with respect to the maximum dimension of the winding part 42 that considers winding variation, which makes this an ideal example of the relationship of L3>L4 where L4 is even smaller.

The lead parts 44a, 44b are bent toward the flange part 14a along the side face 22 of the flange part 14a, and connected to a pair of external electrodes 60a, 60b that are provided on the outer face 17a, opposite the inner face 15a on which the winding shaft 12 is provided, of the flange part 14a. This way, the coil 40 is electrically connected to the external electrodes 60a, 60b. The external electrodes 60a, 60b are each formed by, for example, a multi-layer metal film constituted by a solder barrier layer and a solder wetting layer, provided in this order on a base layer. Examples of materials for the base layer include copper, silver, palladium, silver-palladium alloy, etc. Examples of materials for the solder barrier layer include nickel. Examples of materials for the solder wetting layer include tin, lead, tin-lead alloy, silver, copper, zinc, etc. The winding part 42 is roughly flush with the side faces 22, 32 on the side face 22 side of the flange part 14a and on the side face 32 side of the flange part 14b, but on the sides of the side faces 24, 26, 28, other than the side face 22, of the flange part 14a, and also on the sides of the side faces 34, 36, 38, other than the side face 32, of the flange part 14b, the winding part 42 stays on the inner side of these side faces.

The difference (X1−X2) between the distance X1 between the side face 24 of the flange part 14a and the winding shaft 12, and the distance X2 between the side face 22 of the flange part 14a and the winding shaft 12, is equal to or greater than the thickness T of the conductive wire 46 (T (X1−X2)). Similarly, the difference (X3−X4) between the distance X3 between the side face 34 of the flange part 14b and the winding shaft 12, and the distance X4 between the side face 32 of the flange part 14b and the winding shaft 12, is equal to or greater than the thickness T of the conductive wire 46 (T (X3−X4)). In other words, the axial center 20 of the winding shaft 12 is offset, by roughly an equivalent of the thickness T of the conductive wire 46, from the center 16 of the inner face 15a of the flange part 14a where the winding shaft 12 is provided, and from the center 18 of the inner face 15b of the flange part 14b where the winding shaft 12 is provided, toward the side face 22 of the flange part 14a and toward the side face 32 of the flange part 14b, respectively.

The exterior resin 50 is provided between the flange parts 14a, 14b in a manner covering the winding part 42 of the coil 40. Furthermore, the exterior resin 50 may be provided along the side face 22 of the flange part 14a in a manner covering the lead parts 44a, 44b that have been bent toward the flange part 14a. For example, the exterior resin 50 is provided between the flange parts 14a, 14b in a manner completely covering the periphery of the winding part 42 of the coil 40, but it only needs to be provided at least partially between the flange parts 14a, 14b. Preferably on any one or all of the side faces 24, 26, 28 of the flange part 14a and the side faces 34, 36, 38 of the flange part 14b, the exterior resin 50 does not project outward beyond, but stays on the inner side of, the side faces excluding the side face 22 of the flange part 14a and the side face 32 of the flange part 14b. On the side face 22 side of the flange part 14a and on the side face 32 side of the flange part 14b, the exterior resin 50 projects outward beyond the side face 22 of the flange part 14a and the side face 32 of the flange part 14b and covers the lead parts 44a, 44b. The exterior resin 50 is formed by, for example, a resin containing magnetic grains (such as a ferrite material, magnetic metal material, or insulating resin, such as epoxy resin, containing magnetic metal grains, etc.). Here, projecting outward beyond a side face of a flange part means the exterior resin exists in the outward direction beyond the side face of the flange part, where the outward direction represents the direction from the axial center of the winding shaft of the coil component toward the side face of the flange part. For example, the projecting exterior resin, by covering the side face of the flange part, can constitute a part of the outer configuration of the coil component.

Next, a method for manufacturing the coil component 100 in Example 1 is explained. First, a drum core 10 is formed using dies. Next, a conductive wire 46 is wound around the winding shaft 12 of the drum core 10, while both ends of the conductive wire 46 are bent, to form a coil 40 that includes a winding part 42 where the wire is wound around the winding shaft 12, and lead parts 44a, 44b that are led out from the winding part 42 and bent toward the flange part 14a. Next, a tray having multiple recessed storage parts is prepared, and a drum core 10 in which a coil 40 has been formed is placed in each of the multiple storage parts. Here, each drum core 10 is placed in a storage part with its flange part 14a facing up. Next, a resin is applied over the tray to form an exterior resin 50 covering the coils 40. Next, the exterior resin 50, and the tray, are ground from the top face side and bottom face side of the tray, to expose the flange part 14a, 14b surfaces of the drum cores 10. Next, external electrodes 60a, 60b to be connected to the lead parts 44a, 44b of the coils 40 are formed on the flange part 14a surfaces using the printing method, etc. Thereafter, the multiple storage parts are separated into individual pieces using a dicer, etc., to form coil components 100 according to Example 1.

Loosening of winding in the winding part 42 that can occur when the lead parts 44*a*, 44*b* are led out from the winding part 42 and bent toward the flange part 14*a*, can be reduced by shortening the distance from the part of the winding part 42 from which the lead parts 44*a*, 44*b* are led out, to the side face 22 of the flange part 14*a* toward which the lead parts 44*a*, 44*b* are bent. When this distance is short, the location clamped by the bending jig to perform bending can be set closer to the winding part 42, which reduces loosening of winding in the winding part 42 and also improves the bending accuracy. In the comparative example, the bending jig must be placed in the limited space between the flange part 514*a* and the flange part 514*b*; in Example 1, on the other hand, the bending jig can be placed not only between the flange part 14*a* and the flange part 14*b*, but also on the side face 22 side of the flange part 14*a* by avoiding contact with the flange part 14*a*, and therefore the bending accuracy can be improved with ease. In the comparative example, the shortest distance L2 between the side face of the flange part 514*a* toward which the lead parts 544*a*, 544*b* are led out and the outermost periphery of the winding part 542, is equal to the shortest distance L1 between the opposite side face of the flange part 514*a* across the axial center of the winding shaft 512 toward which the lead parts 544*a*, 544*b* are not led out and the outermost periphery of the winding part 542 (L2=L1). According to Example 1, on the other hand, the shortest distance L4 between the side face 22 of the flange part 14*a* toward which the lead parts 44*a*, 44*b* are led out and the outermost periphery of the winding part 42, is shorter than the shortest distance L3 between the side face 24, which is the face opposite the side face 22 across the axial center of the winding shaft 12, of the flange part 14*a*, and the outermost periphery of the winding part 42 (L3>L4), as shown in FIG. 2B. This means that, in Example 1, the distance from the part of the winding part 42 from which the lead parts 44*a*, 44*b* are led out, to the side face 22 of the flange part 14*a* toward which the lead parts 44*a*, 44*b* are bent, can be shortened, which in turn prevents loosening of winding in the winding part 42. As a result, dropping of the inductance can be prevented.

As shown in FIG. 2B, preferably the shortest distance L4 between the side face 22 of the flange part 14*a* and the outermost periphery of the winding part 42 is equal to or smaller than the thickness of the conductive wire 46 in the direction vertical to the axial center of the winding shaft 12. In other words, the shortest distance between the side face 22 of the flange part 14*a* and the outermost periphery of the winding part 42 represents a distance that prevents winding of the conductive wire 46 by one more loop. In essence, the shortest distance L4 between the side face 22 of the flange part 14*a* and the outermost periphery of the wound part 42, roughly corresponds to a distance equal to or smaller than the thickness of the conductive wire 46 in the direction vertical to the axial center 20 of the winding shaft 12. As a result, the distance from the part of the winding part 42 from which the lead parts 44*a*, 44*b* are led out, to the side face 22 of the flange part 14*a* toward which the lead parts 44*a*, 44*b* are bent, becomes shorter and therefore loosening of winding in the winding part 42 can be prevented effectively. In the interest of effectively preventing loosening of winding in the winding part 42, preferably the side face 22 of the flange part 14*a* roughly corresponds to the outermost periphery of the winding part 42, which means L4≈0, as shown in FIG. 2B. This way, the distance from the part of the winding part 42 from which the lead parts 44*a*, 44*b* are led out, to the side face 22 of the flange part 14*a* toward which the lead parts 44*a*, 44*b* are bent, can be shortened. The shorter the distance from the part of the winding part 42 from which the lead parts 44*a*, 44*b* are led out, to the side face 22 of the flange part 14*a* toward which the lead parts 44*a*, 44*b* are bent, the further prevented is loosening of winding in the winding part 42 which may otherwise occur due to the elasticity of the conductive wire 46, and therefore L4=0 is more preferable.

Also, a rectangular wire or other conductive wire having a thick cross-section in the direction vertical to the axial center 20 of the winding shaft 12 may be used for the conductive wire 46 that constitutes the coil 40, or alpha-winding or other structure that allows the conductive wire 46 to be wound by applying hardly any force in the bending direction may be used, in which case the elasticity of the conductive wire 46 may increase. In these cases, however, adopting a structure that achieves the relationship of L3>L4 prevents loosening of winding in the winding part 42 when the lead parts 44*a*, 44*b* are led out from the winding part 42, which can consequently prevent the inductance from deteriorating.

It is clear from FIG. 2B that, to shorten the distance L4 between the outermost periphery of the winding part 42 on the side toward which the lead parts 44*a*, 44*b* are led out and the side face 22 of the flange part 14*a*, preferably the axial center 20 of the winding shaft 12 is set in a manner offset from the center 16 of the inner face 15*a* of the flange part 14*a*.

Preferably, as shown in FIG. 2A, the shortest distance L6 between the side face 32 of the flange part 14*b* which is the side toward which the lead parts 44*a*, 44*b* are led out and the outermost periphery of the winding part 42 is shorter than the shortest distance L5 between the side face 34 opposite the side face 32 of the flange part 14*b* with respect to the winding shaft 12 and the outermost periphery of the winding part 42. This way, the winding part 42 on the side face 32 side of the flange part 14*b* becomes closer to the side face 32, and consequently the jig for bending the lead parts 44*a*, 44*b* toward the flange part 14*a* can be placed by avoiding contact with the flange part 14*a* or the flange part 14*b*, and this, in turn, permits easy, accurate bending of the lead parts 44*a*, 44*b* toward the flange part 14*a*. Because there is no need to consider the possibility of the bending jig making contact, the bending jig can be given more degrees of freedom and bending can be performed by factoring in return movements, and this, in turn, permits accurate formation of the lead parts 44*a*, 44*b*. With regard to the winding shaft 12, preferably the axial center 20 is offset from the center 16 of the inner face 15*a*, toward the side face 22, of the flange part 14*a*, and also from the center 18 of the inner face 15*b*, toward the side face 32, of the flange part 14*b*. The side face 22 of the flange part 14*a* and the side face 32 of the flange part 14*b* are positioned on the same side of the winding shaft 12. Because the axial center 20 is offset this way, the drum core 10 can be easily aligned in the same orientation by detecting how much the axial center 20 is offset. When a coil 40 is subsequently formed in the orientationally aligned drum core 10, the shortest distance L4 between the side face 22 of the flange part 14*a* and the outermost periphery of the winding part 42 can be made shorter, while the shortest distance L6 between the side face 32 of the flange part 14*b* and the outermost periphery of the winding part 42 can also be made shorter. Here, a coil 40 and lead parts 44*a*, 44*b* can be produced easily by, for example, using a round conductive wire with a spindle or flyer, or a rectangular wire that has been alpha-wound, and by combining a conventional winding method with a conventional bending jig. Furthermore, this ability to accurately form lead parts 44*a*, 44*b* also helps prevent loosening of winding in the winding part 42.

As shown in FIGS. 3B and 3C, preferably an exterior resin 50 is provided which covers the coil 40 and is formed by a resin containing magnetic grains. And, preferably the exterior resin 50 covers the lead parts 44*a*, 44*b* on the side face 22 side of the flange part 14*a*, and on the side face 22 of the flange part 14*a*, the exterior resin 50 projects outward beyond the side face 22 of the flange part 14*a*. This way, magnetic flux leakage can be effectively prevented and the electrical properties can be improved. Also, the exterior resin 50 secures the lead parts 44*a*, 44*b* in place, to protect the conductive wire.

As shown in FIGS. 3B and 3C, preferably the minimum value T1 of the thickness of the exterior resin 50 covering the lead parts 44*a*, 44*b* on the side face 22 side of the flange part 14*a*, is greater than the minimum values T2, T3, T4 of the thickness of the exterior resin 50 covering the winding part 42 on the side face 24, 26, 28 sides of the flange part 14*a*. It should be noted that, here, the "thickness of the exterior resin 50" refers to the thickness in the direction perpendicular to the axial center 20 of the winding shaft 12, and represents the length dimension from the outermost periphery surface of the conductive wire 46 (including the lead parts 44*a*, 44*b*) to the surface of the exterior resin 50, as measured in the direction perpendicular to the axial center 20 of the winding shaft 12. In general, the minimum value of the thickness of the exterior resin on a side face of a flange part corresponds to the thickness in a direction which, among other directions perpendicular to the axial center of the winding shaft, also intersects at right angles the side face of the flange part. By increasing the thickness of the exterior resin 50 covering the lead parts 44*a*, 44*b*, magnetic flux leakage can be effectively prevented and the electrical properties can be improved.

Figure 4:
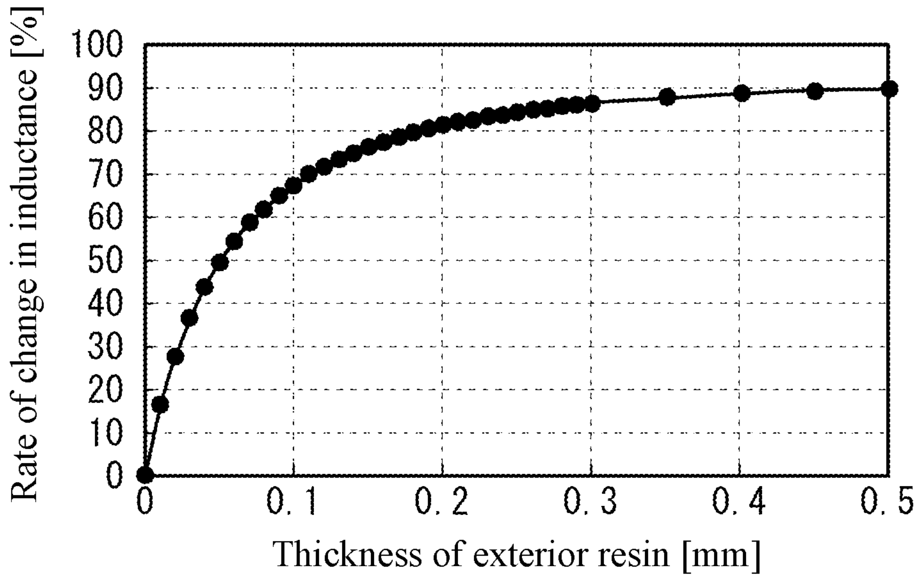
FIG. 4 shows the result of a simulation evaluating the relationship between the thickness of the exterior resin covering the lead parts, and the inductance.

FIG. 4 shows the result of a simulation evaluating the relationship between the thickness of the exterior resin covering the lead parts, and the inductance. The horizontal axis in FIG. 4 represents the minimum value T1 of the thickness of the exterior resin 50 covering the lead parts 44*a*, 44*b* (refer to FIG. 3B). The vertical axis in FIG. 4 represents the rate of change in inductance, calculated by dividing the amount of change (ΔL) between the inductance L0 when no exterior resin 50 is provided and the inductance Lt after an exterior resin 50 of thickness t has been provided (ΔL=Lt−L0), by the inductance Lt (ΔL/Lt). The simulation assumes that the drum core 10 is formed by a magnetic material with a specific magnetic permeability of 35, and that the exterior resin 50 is formed by a combined resin and magnetic material with a specific magnetic permeability of 28. As for the structure of the coil 40, the conductive wire 46 from which it is formed, is assumed to be a copper wire whose surface is covered with polyimide.

It is clear from FIG. 4 that a higher inductance can be achieved by making the exterior resin 50 covering the lead parts 44*a*, 44*b* thicker. This is probably because, as the exterior resin 50 becomes thicker, it serves as a more effective magnetic path to reduce the magnetic field disturbances generating in the coil 40 as a whole due to generation of magnetic fluxes by the lead parts 44*a*, 44*b* in directions different from those of the magnetic fluxes generating in the winding part 42 of the coil 40. It is also shown that the rate of change (rate of increase) in the inductance value compared to when the thickness of the exterior resin 50 is 0 mm, becomes small, smaller, and even smaller when the minimum value T1 of the thickness of the exterior resin 50 is 0.2 mm or greater, 0.3 mm or greater, and 0.4 mm or greater, respectively. It should be noted that, even when materials other than those assumed by the simulation are used, similar results are still obtained regarding the thickness of the exterior resin 50. In other words, this simulation is only an example and the magnetic permeabilities assumed therein only represent examples of magnetic permeabilities achieved when the aforementioned general magnetic material and resin material are used. Within the ranges of magnetic permeabilities achieved when the aforementioned general magnetic material and resin material are used, largely similar results are obtained regarding the thickness of the exterior resin 50. For example, the simulation assumes that the drum core 10 has a specific magnetic permeability of 35, but when designing a coil component meeting higher performance requirements, the specific magnetic permeability of the drum core 10 must be higher than 35, in which case the obtained results are still similar. Furthermore, the simulation assumes that the exterior resin has a specific magnetic permeability of 28, but if the thickness of the exterior resin 50 is 0 mm, the magnetic permeability of the air in this area is used in place of the magnetic permeability of the exterior resin 50. Considering that the magnetic permeability of this air is 1, the magnetic permeability of the exterior resin 50 only needs to be at least several times higher, and even higher performance can be achieved when the ratio of the magnetic permeability of the exterior resin 50 to the magnetic permeability of the drum core 10 is 0.5 or greater. Accordingly, the minimum value T1 of the thickness of the exterior resin 50 covering the lead parts 44*a*, 44*b* is preferably 0.2 mm or greater, or more preferably 0.3 mm or greater, or even more preferably 0.4 mm or greater. In the interest of making the coil component 100 smaller, on the other hand, the minimum value T1 of the thickness of the exterior resin 50 covering the lead parts 44*a*, 44*b* is preferably 0.6 mm or smaller, or more preferably 0.5 mm or smaller, or even more preferably 0.4 mm or smaller.

As shown in FIGS. 2A and 2B, preferably the winding part 42 of the coil 40 stays between the flange parts 14*a*, 14*b* and does not project outward beyond the side face 22 of the flange part 14*a* or the side face 32 of the flange part 14*b*. Because the magnetic permeabilities of the flange parts 14*a*, 14*b* are higher than the magnetic permeability of the exterior resin 50, the fact that the winding part 42 stays between the flange parts 14*a*, 14*b* serves to improve the inductance and other electrical properties.

As shown in FIGS. 3B and 3C, preferably on the side face 22 side of the flange part 14*a* and on the side face 32 side of the flange part 14*b*, the exterior resin 50 projects outward beyond the side face 22 of the flange part 14*a* and the side face 32 of the flange part 14*b*. On the other hand, preferably on at least one side face among the side faces 24, 26, 28, excluding the side face 22, of the flange part 14*a*, the exterior resin 50 does not project outward beyond the side face 22 of the flange part 14*a* or the side face 32 of the flange part 14*b*, but stays between the flange parts 14*a*, 14*b* instead. This way, magnetic flux leakage can be prevented to prevent drop in inductance, while the component size can be reduced at the same time.

As shown in FIG. 2B, the difference (X1−X2) between the distance X1 between the side face 24 of the flange part 14*a* and the winding shaft 12, and the distance X2 between the side face 22 of the flange part 14*a* and the winding shaft 12, is equal to or greater than the thickness T of the conductive wire 46 that constitutes the coil 40; preferably, however, it is roughly the same as the thickness T of the conductive wire 46 that constitutes the coil 40. Similarly, as shown in FIG. 2A, the difference (X3−X4) between the distance X3 between the side face 34 of the flange part 14*b* and the winding shaft 12, and the distance X4 between the side face 32 of the flange part 14*b* and the winding shaft 12, is equal to or greater than the thickness T of the conductive wire 46 that constitutes the coil 40; preferably, however, it is roughly the same as the thickness T of the conductive wire 46 that constitutes the coil 40. This way, the coil component 100 can be made smaller, and the lead parts 44*a*, 44*b* can also be bent toward the flange part 14*a*. It should be noted that "roughly the same" includes deviations within manufacturing errors or so, or specifically errors of approx. 10% to 20%, for example.

As shown in FIGS. 2B and 3C, preferably the external electrodes 60*a*, 60*b* are not provided on, among the surfaces of the coil component 100, the surfaces other than those that include the outer face 17*a* which is the face opposite the inner face 15*a* of the flange part 14*a* on which the winding shaft 12 is provided. This outer face 17*a* may be partially recessed or projecting, or its corners and sides may be tapered or rounded. By thus providing the external electrodes 60*a*, 60*b* only on the surfaces that include the outer face 17*a* of the flange part 14*a*, among the surfaces of the coil component 100, the coil component 100 can be made smaller. Additionally, this prevents the coil component 100 from shorting with components adjacent to it when mounted on a circuit board, etc., which permits high-density mounting.

Figure 5A:
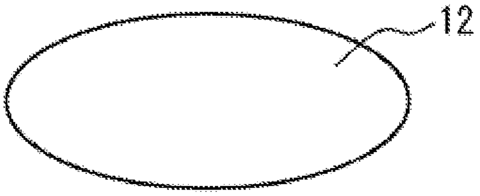
FIGS. 5A to 5D are plane views showing other cross-section shapes of the winding shaft.
Figure 5B:
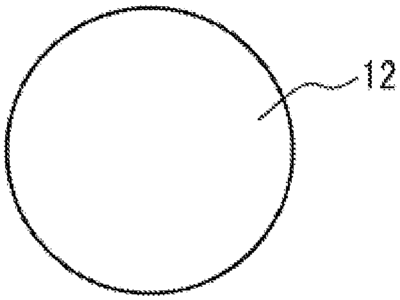
Figure 5C:
Figure 5D:
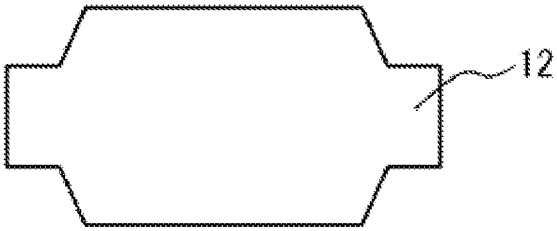

As shown in FIGS. 2A and 2B, the winding shaft 12 has a cross-section shape defined by straight lines and two arcs in a plane view from the axial direction. In other words, the cross-section of the winding shaft 12 in contact with the inner faces 15*a*, 15*b* of the flange parts 14*a*, 14*b* has a shape defined by straight lines and two arcs. It should be noted, however, that this is not the only case. FIGS. 5A to 5D are plane views showing other cross-section shapes of the winding shaft. As shown in FIG. 5A, the winding shaft 12 may have an oval shape cross-section in a plane view from the axial direction. As shown in FIG. 5B, the winding shaft 12 may have a circular shape cross-section in a plane view from the axial direction. As shown in FIG. 5C, the winding shaft 12 may have an oblong, square, or other rectangular shape cross-section in a plane view from the axial direction. As shown in FIG. 5D, the winding shaft 12 may have a rectangular shape cross-section in a plane view from the axial direction, where a pair of sides facing each other are projecting outward.

Figure 3D:
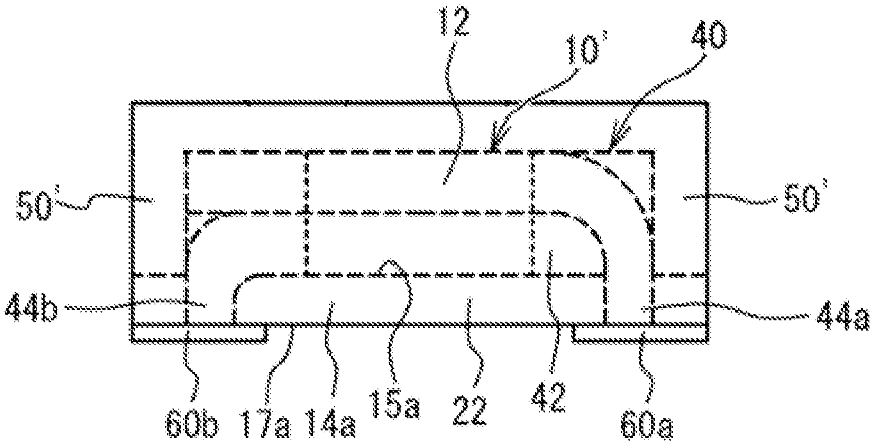
FIG. 3D is a perspective side view of a variation of the coil component pertaining to Example 1.

FIG. 3D is a perspective side view of a variation of the coil component pertaining to Example 1, which has the same configurations as those described in Example 1 except that the second flange is eliminated, wherein a drum core 10' is constituted by the winding shaft 12 and the first flange part 14*a* without the second flange part 14*b*, and an exterior resin 50' fully occupies the portion occupied by the second flange part 14*b*. A coil component without a second flange part exhibits excellent effects substantially similar to those described above in relation to the coil component of Example 1.

Example 2

Figure 6:
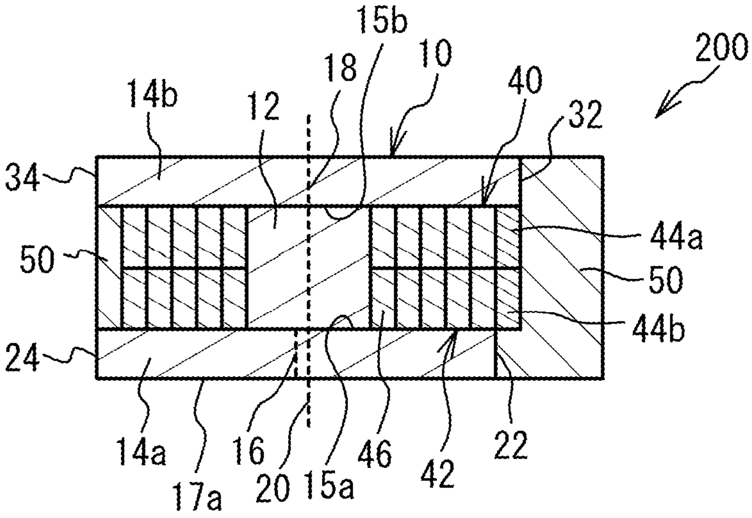
FIG. 6 is a cross-sectional view of the coil component pertaining to Example 2.

FIG. 6 is a cross-sectional view of the coil component pertaining to Example 2. It should be noted that FIG. 6 is a cross-sectional view of a location corresponding to B-B in FIG. 2A illustrating Example 1. In Example 1, the flange parts 14*a*, 14*b* are shaped as rectangles of roughly the same size in a plane view from the axial direction of the winding shaft 12, and the centers 16, 18 of these rectangles roughly correspond to each other in the axial direction of the winding shaft 12. As shown in FIG. 6, however, the coil component 200 in Example 2 is such that the flange parts 14*a*, 14*b* are shaped as rectangles of different sizes in a plane view from the axial direction of the winding shaft 12, and the centers 16, 18 of these rectangles do not correspond to each other in the axial direction of the winding shaft 12. The axial center 20 of the winding shaft 12 is offset from the center 16 of the inner face 15*a* on which the winding shaft 12 is provided, toward the side face 22, of the flange part 14*a*. On the other hand, the axial center 20 of the winding shaft 12 corresponds to the center 18 of the inner face 15*b* on which the winding shaft 12 is provided, of the flange part 14*b*, or the axial center 20 of the winding shaft 12 is offset by an amount different from the amount of offset from the center 16 of the inner face 15*a* on which the winding shaft 12 is provided, toward the side face 22, of the flange part 14*a*. The remaining constitutions are the same as those of the coil component 100 in Example 1, and are therefore not explained.

In Example 1, the axial center 20 of the winding shaft 12 is offset from the center 16 of the inner face 15*a* on which the winding shaft 12 is provided, toward the side face 22, of the flange part 14*a*, and also offset from the center 18 of the inner face 15*b* on which the winding shaft 12 is provided, toward the side face 32, of the flange part 14*b*. However, this is not the only case and, so long as the axial center 20 of the winding shaft 12 is offset from the center 16 of the inner face 15*a* on which the winding shaft 12 is provided, toward the side face 22, of the flange part 14*a*, the axial center 20 may be positioned at the center 18 of the inner face 15*b* of the flange part 14*b* on which the winding shaft 12 is provided, or it may be offset by an amount different from the amount of offset from the center 16 of the inner face 15*a* on which the winding shaft 12 is provided, toward the side face 22, of the flange part 14*a*, as in Example 2.

Example 3

Figure 7:
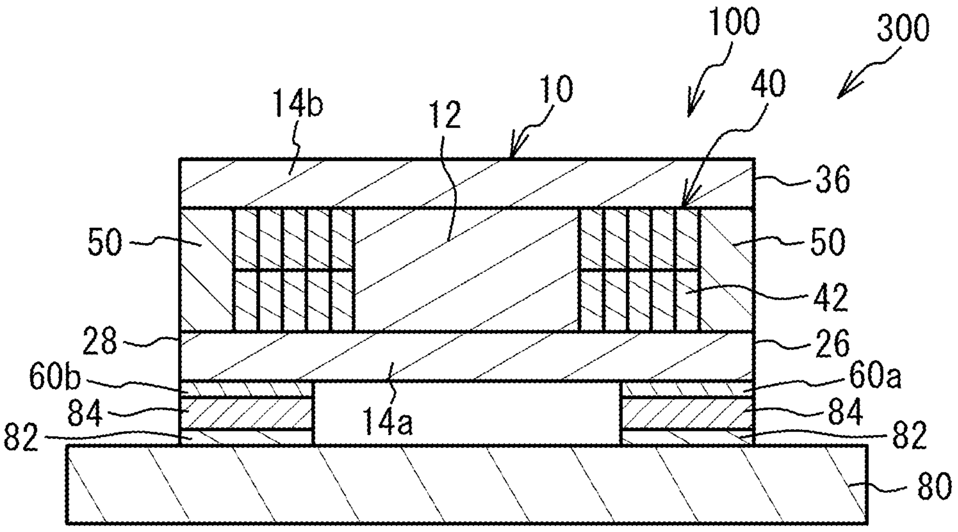
FIG. 7 is a cross-sectional view of the electronic device pertaining to Example 3.

FIG. 7 is a cross-sectional view of the electronic device pertaining to Example 3. As shown in FIG. 7, the electronic device 300 in Example 3 comprises a circuit board 80, and a coil component 100 in Example 1 mounted on the circuit board 80. The coil component 100 is mounted on the circuit board 80 as its external electrodes 60*a*, 60*b* are joined to an electrode 82 on the circuit board 80 by a solder 84.

According to the electronic device 300 in Example 3, where the coil component 100 in Example 1 is mounted on the circuit board 80, an electronic device comprising a coil component which has a small mounting space owing to a structure where the lead parts provided on a single face are connected to the external electrodes 60*a*, 60*b*, respectively, and which also prevents deterioration in inductance, can be obtained. Also, the distances from the lead parts 44*a*, 44*b* of the coil component 100 to the circuit board 80 can be shortened, which in turn allows resistance generated in the conductive wire to be lowered. Also, in the case of a low-inductance coil component, the distances from the lead parts 44*a*, 44*b* to the circuit board 80 can be made especially shorter, to prevent resistance from increasing due to mounting. It should be noted that, while Example 3 provides an example of mounting the coil component 100 in Example 1 on the circuit board 80, the coil component 200 in Example 2 may be mounted instead.

The foregoing described the examples of the present invention in detail; however, the present invention is not limited by these specific examples, and various modifications and changes may be added to the extent that the results do not deviate from the key points of the present invention described in "What Is Claimed Is."

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed:

1. A coil component comprising:

a drum core that includes a winding shaft and a first flange part provided at one end of the winding shaft in an axial direction;

a coil that includes a winding part constituted by a conductive wire being wound around the winding shaft, and a pair of lead parts constituted by the conductive wire being bent from an end of the winding part onto a first side face of the first flange part as viewed toward the first side face in a direction orthogonal to an axis of the winding shaft, said first side face connecting an inner face on which the winding shaft is provided, and an outer face opposite the inner face in the axial direction, of the first flange part; and a pair of external electrodes that are provided on the outer face of the first flange part, and connected to the pair of lead parts;

wherein, among distances between the first side face of the first flange part on a plane on which the pair of lead parts are disposed, and any outermost wound part of the winding part, a shortest distance is a distance at a first point on the first side face of the first flange part, wherein the shortest distance at the first point is shorter than a shortest distance between a second side face, which is a face opposite the first side face across the winding shaft, of the first flange part, and any outermost wound part of the winding part, at a symmetry point of the first point, on the second side face with respect to a center point of the first flange part, wherein a bottom face of the winding shaft at the one end of the winding shaft has dimensions defined by a length A in a long direction and a length B in a short direction, wherein a value A/B is 1.1 or greater but no greater than 2.6, wherein a distance between an axial center of the winding shaft and the first side face, on which the lead parts are provided, of the first flange part is shorter than a distance between the axial center of the winding shaft and the second side face of the first flange part as viewed in the axial direction of the winding shaft, and wherein the shortest distance between the first side face of the first flange part and the outermost wound part of the winding part is equal to or smaller than a thickness of the conductive wire in a direction perpendicular to an axial center of the winding shaft.

2. The coil component according to claim 1, wherein the drum core further includes a second flange part provided at another end of the winding shaft in the axial direction.

3. The coil component according to claim 2, wherein a shortest distance between a third side face of the second flange part and the outermost wound part of the winding part is shorter than a shortest distance between a fourth side face, which is a face opposite the third side face across the winding shaft, of the second flange part, and the outermost wound part of the winding part, wherein the first side face of the first flange part, and the third side face of the second flange part, are positioned on a same side of the winding shaft as viewed in the axial direction of the winding shaft.

4. The coil component according to claim 2, wherein an exterior resin formed by a resin containing magnetic grains is provided, in a manner covering the coil, at least partially between the first flange part and the second flange part, and the exterior resin further covers the pair of lead parts, wherein on the first side face of the first flange part, the exterior resin projects outward beyond the first side face of the first flange part as viewed in the axial direction.

5. The coil component according to claim 4, wherein a minimum value of a thickness of the exterior resin, covering the lead parts on the first side face side of the first flange part, in a direction which is perpendicular to an axis of the winding shaft and passes through the winding part in a direction perpendicular to the first side face of the first flange part, is greater than a minimum value of a thickness of the exterior resin, covering the winding part on a side of a side face, other than the first side face, of the first flange part, in the direction which is perpendicular to the axis of the winding shaft and passes through the winding part in a direction perpendicular to the side face, other than the first side face, of the first flange part.

6. The coil component according to claim 4, wherein the exterior resin projects outward beyond the first side face of the first flange part on the first side face of the first flange part, while staying between the first flange part and the second flange part on at least one side face, excluding the first side face, of the first flange part, as viewed in the axial direction.

7. The coil component according to claim 4, wherein a minimum value of the thickness of the exterior resin covering the lead parts on the first side face side of the first flange part, is 0.2 mm or greater.

8. The coil component according to claim 2, wherein the winding part stays between the first flange part and the second flange part.

9. The coil component according to claim 1, wherein, with respect to the coil, the conductive wire is alpha-wound around the winding shaft, wherein one of the lead parts extends from an outermost layer of the conductive wire of the winding part at the one end of the winding shaft, and another of the lead parts extends from an outermost layer of the conductive wire of the winding part at another end of the winding shaft in the axial direction.

10. The coil component according to claim 1, wherein, with respect to the coil, the conductive wire is a rectangular wire.

11. The coil component according to claim 1, wherein the pair of external electrodes are provided on, among surfaces of the coil component, surface or surfaces, including the outer face, of the first flange part.

12. An electronic device, comprising:

the coil component according to claim 1; and a circuit board on which the coil component is mounted.

* * * * *